(12) United States Patent
Kao

(10) Patent No.: US 6,902,298 B2
(45) Date of Patent: Jun. 7, 2005

(54) LAMP DEVICE RESPONSIVE TO AMBIENT LIGHT CONDITIONS AND HAVING A ROTARY LAMP BASE

(76) Inventor: Te-Shu Kao, 3F-1, No. 210, 38th Rd., Kung-Yeh Dist., Taichung City (TW)

( * ) Notice: Subject to any disclaimer, the term of this patent is extended or adjusted under 35 U.S.C. 154(b) by 116 days.

(21) Appl. No.: 10/643,650

(22) Filed: Aug. 18, 2003

(65) Prior Publication Data

US 2004/0223331 A1 Nov. 11, 2004

(51) Int. Cl.[7] .................................................. F21V 1/00
(52) U.S. Cl. ........................ 362/285; 362/276; 362/427; 362/429
(58) Field of Search ................................. 362/276, 147, 362/148, 150, 285, 418, 427, 429, 430, 802, 441, 437, 439, 449

(56) References Cited

U.S. PATENT DOCUMENTS 6,294,873 B1 * 9/2001 Yu ............................. 362/276

6,375,338 B1 * 4/2002 Cummings et al. ......... 362/276

* cited by examiner

Primary Examiner—Thomas M. Sember
Assistant Examiner—Bao Q. Truong
(74) Attorney, Agent, or Firm—David T. Millers

(57) ABSTRACT

A lamp device includes a power line and a light bulb socket connected to a light sensitive controller, and a rotary lamp base. The rotary lamp base includes a shell member, a tubular pivot seat, and a retaining unit. The shell member includes a top wall and a peripheral wall, and receives the socket and the controller therein. The top wall is formed with a through hole that has a hole axis. The peripheral wall is formed with a light sensor hole registered with the controller. The retaining unit retains rotatably a lower seat portion of the pivot seat in the through hole so as to permit rotation of the shell member relative to the pivot seat about the hole axis.

13 Claims, 6 Drawing Sheets

LAMP DEVICE RESPONSIVE TO AMBIENT LIGHT CONDITIONS AND HAVING A ROTARY LAMP BASE

BACKGROUND OF THE INVENTION

1. Field of the Invention

The present invention relates to a lamp device, more particularly to a lamp device responsive to ambient light conditions and having a rotary lamp base.

2. Description of the Related Art

As shown in FIG. 1, a conventional lamp device 1 is adapted to be mounted on a ceiling 3, is adapted for use with a light bulb 2, and includes a lamp base 11 that is formed with a receiving space 12, and a light sensitive controller 21 that is received in the receiving space 12 and that is responsive to ambient light conditions for turning the light bulb 2 on and off accordingly.

However, when the lamp device 1 is mounted on the ceiling 3, it cannot be adjusted such that the light sensitive controller 21 is only able to detect ambient light conditions within a fixed direction, which restricts utility of the conventional lamp device 1.

SUMMARY OF THE INVENTION

Therefore, the object of the present invention is to provide a lamp device responsive to ambient light conditions and having a rotary lamp base so as to overcome the aforesaid drawback associated with the prior art.

According to the present invention, there is provided a lamp device that comprises a power line, a socket, a light sensitive controller, and a rotary lamp base. The power line is adapted to be connected to a power source. The socket is adapted for mounting a light bulb. The light sensitive controller is connected to the power line and the socket, and is adapted to enable and disable operation of the light bulb in accordance with ambient light conditions. The rotary lamp base includes a shell member, a tubular pivot seat and a retaining unit. The shell member includes a top wall and a peripheral wall extending downwardly from a periphery of the top wall. The top and peripheral walls cooperate to confine a containing space. The socket and the light sensitive controller are mounted in the containing space. The top wall has top and bottom sides, and a through hole formed through the top and bottom sides to permit extension of the power line out of the containing space. The through hole has a hole axis. The peripheral wall is formed with a light sensor hole that is disposed in a radial direction relative to the hole axis and that is registered with the light sensitive controller to enable the light sensitive controller to detect ambient light conditions. The pivot seat has upper and lower seat portions opposite to each other along the hole axis. The retaining unit retains rotatably the lower seat portion of the pivot seat in the through hole in the top wall of the shell member so as to permit rotation of the shell member relative to the pivot seat about the hole axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
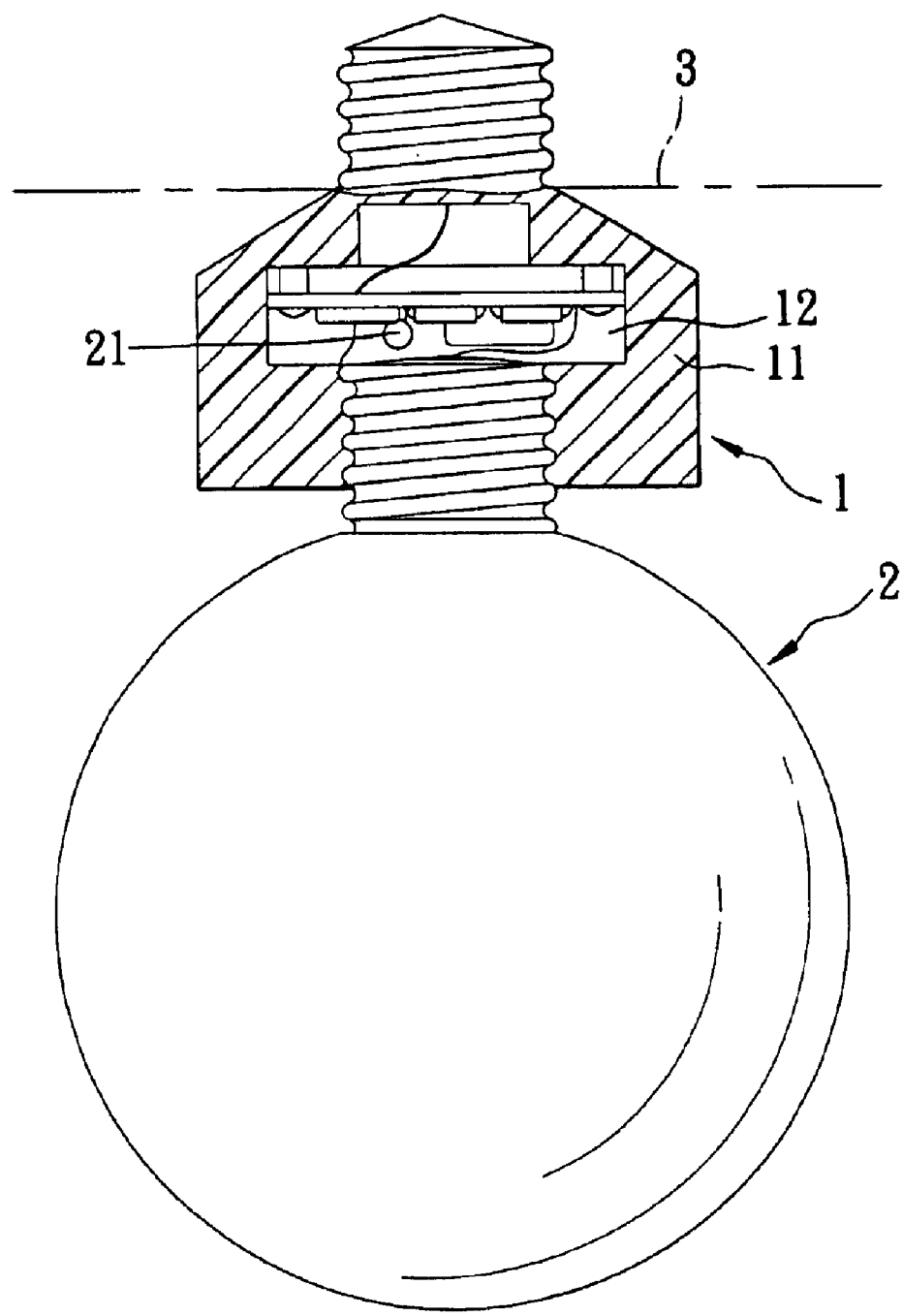
FIG. 1 is a schematic sectional view of a conventional lamp device.
Figure 2:
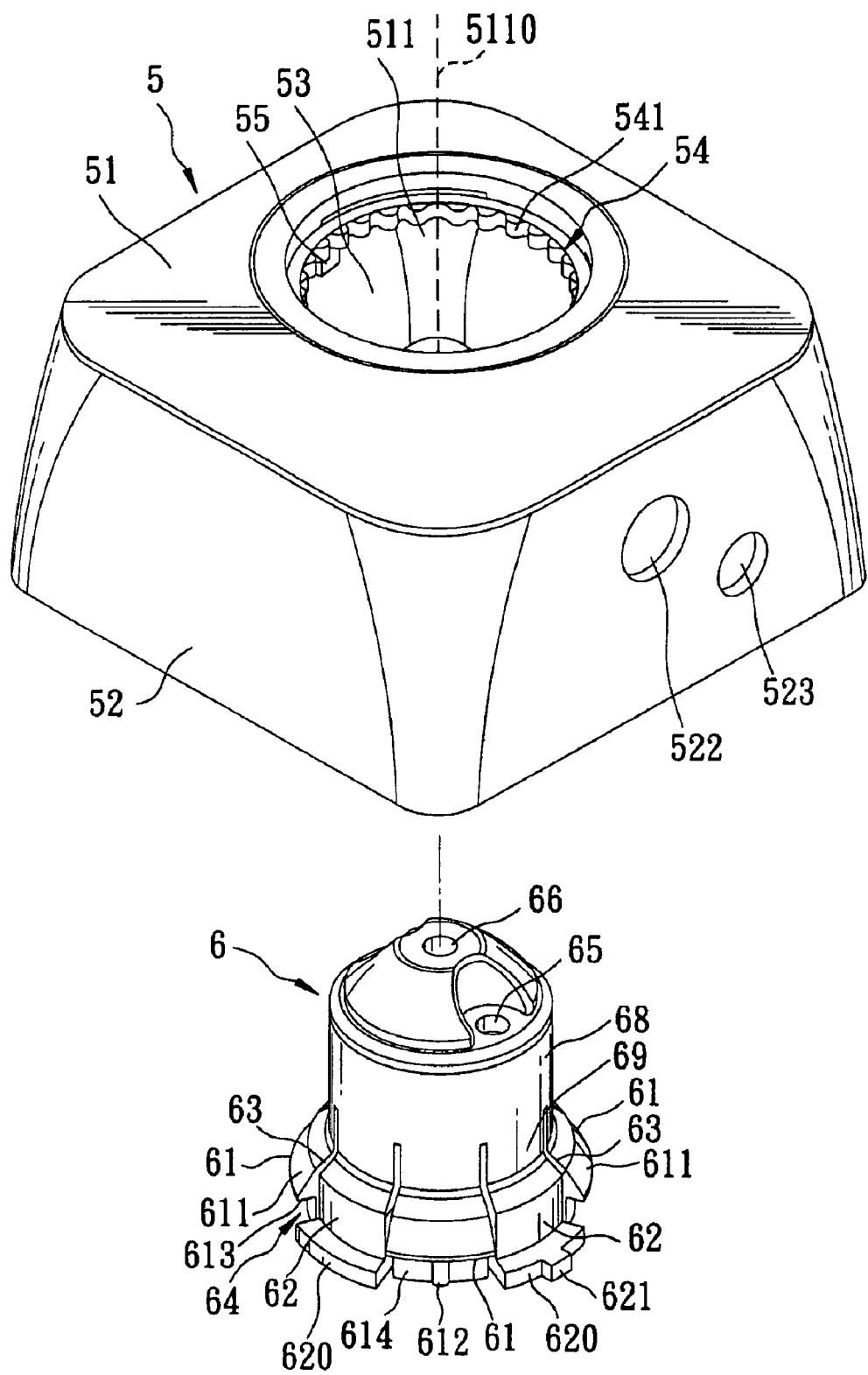
FIG. 2 is an exploded perspective view of the preferred embodiment of a lamp device according to the present invention.
Figure 5:
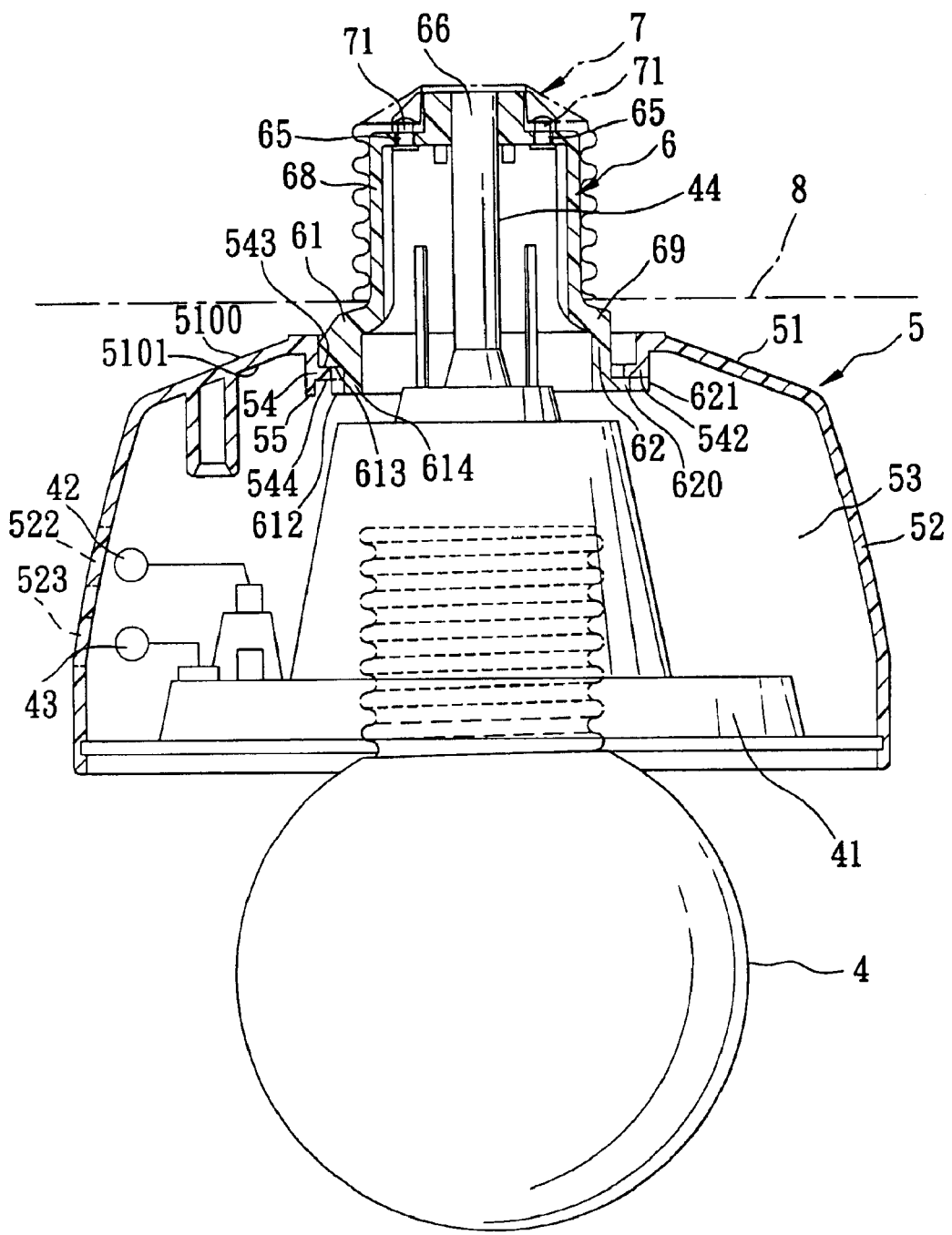
FIG. 5 is an assembled sectional view of the preferred embodiment.

Referring to FIGS. 2 and 5, the preferred embodiment of a lamp device according to the present invention is shown to include a power line 44, a socket 41, a light sensitive controller 42, and a rotary lamp base.

The power line 44 is adapted to be connected to a power source. The socket 41 is adapted for mounting a light bulb 4 in a known manner. The light sensitive controller 42 is connected to the power line 44 and the socket 41, is mounted on the socket 41, and is adapted to enable and disable operation of the light bulb 4 in accordance with ambient light conditions in a conventional manner. Preferably, a temperature sensor 43 is also mounted on the socket 41.

The rotary lamp base includes a shell member 5, a tubular pivot seat 6, and a retaining unit.

The shell member 5 includes a top wall 51 and a peripheral wall 52 extending downwardly from a periphery of the top wall 51. The top and peripheral walls 51, 52 cooperate to confine a containing space 53. The socket 41, the light sensitive controller 42 and the temperature sensor 43 are mounted in the containing space 53. The top wall 51 has top and bottom sides 5100, 5101, and a through hole 511 formed through the top and bottom sides 5100, 5101 to permit extension of the power line 44 out of the containing space 53. The through hole 511 has a hole axis 5110. The peripheral wall 52 is formed with a light sensor hole 522 that is disposed in a radial direction relative to the hole axis 5110 and that is registered with the light sensitive controller 42 to enable the light sensitive controller 42 to detect ambient light conditions. The peripheral wall 52 is further formed with a temperature sensor hole 523 that is disposed adjacent to the light sensor hole 522 and that is registered with the temperature sensor 43.

The retaining unit includes an anchoring ring 54 that is disposed in the through hole 511 and that has top and bottom ring surfaces 543, 544, an outer peripheral ring portion 542 connected to the top wall 51, and an inner peripheral ring surface 541 opposite to the outer peripheral ring portion 542 in radial directions relative to the hole axis 5110. The outer peripheral ring portion 542 and the inner peripheral ring surface 541 are respectively disposed distal from and proximate to the hole axis 5110. In this embodiment, the inner peripheral ring surface 541 of the anchoring ring 54 is a serrated surface.

The tubular pivot seat 6 is extendible through the through hole 511 in the top wall 51 of the shell member 5 from the bottom side 5101 of the top wall 51 when assembling the rotary lamp base, and has upper and lower seat portions 68, 69 opposite to each other along the hole axis 5110. The retaining unit further includes resilient first and second anchor members 61, 62 formed on the lower seat portion 69 of the pivot seat 6 and alternately arranged in a circumferential direction relative to the hole axis 5110. Adjacent ones of the first and second anchor members 61, 62 have a slit 63, which extends parallel to the hole axis 5110, formed therebetween to provide resiliency to the first and anchor members 61, 62 and a space for heat dissipation.

Each of the first anchor members 61 has a wedge portion with a beveled surface 611 that inclines radially, outwardly and downwardly relative to the hole axis 5110, and a stop surface 613 that extends from a lowermost edge of the beveled surface 611 in a radial inward direction relative to the hole axis 5110. The stop surface 613 of the wedge portion of one of the first anchor members 61 terminates at a distal end, and said one of the first anchor members 61 further has an anchor portion 614 that extends downwardly from the distal end of the stop surface 613 and that is formed with an engaging tooth 612 for engaging the inner peripheral ring surface 541 of the anchoring ring 54.

Each of the second anchor members 62 has a distal lower end formed with a stop flange 620 that extends radially and outwardly relative to the hole axis 5110 and that is vertically spaced apart from the stop surfaces 613 of the wedge portions of the first anchor members 61 so as to form a clearance 64 corresponding to thickness of the anchoring ring 54.

Figure 3:
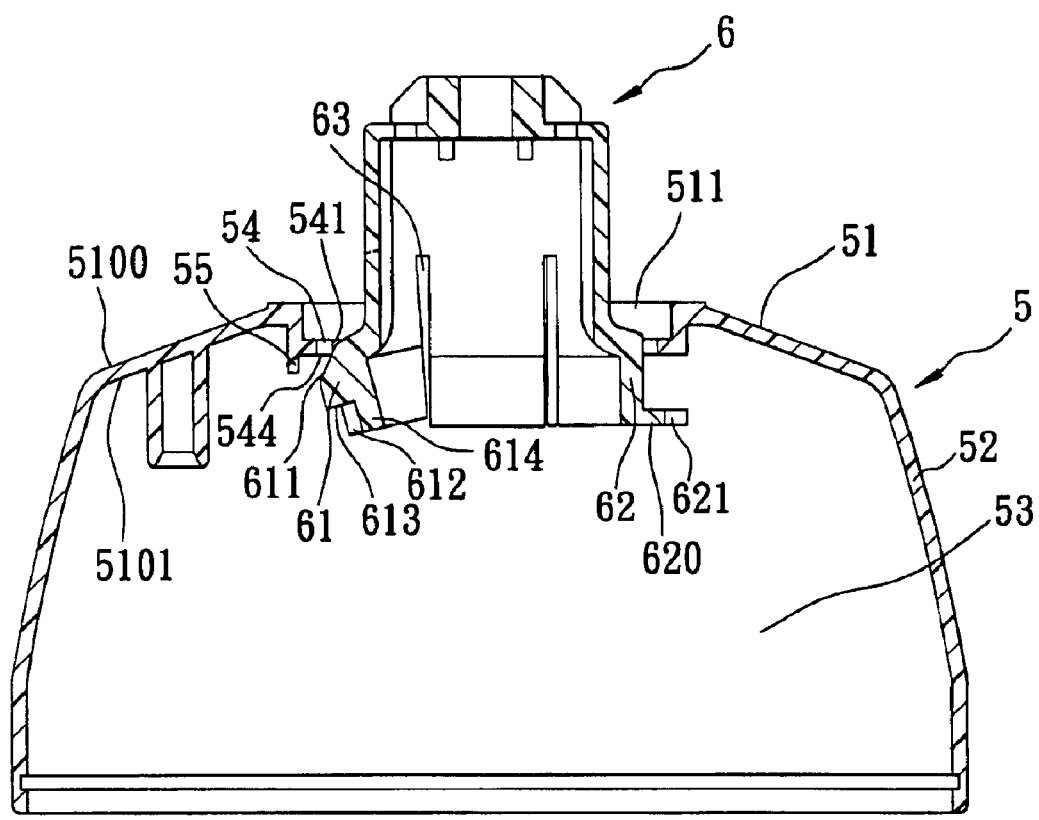
FIG. 3 is a sectional view to illustrate how a rotary lamp base of the preferred embodiment is assembled.
Figure 4:
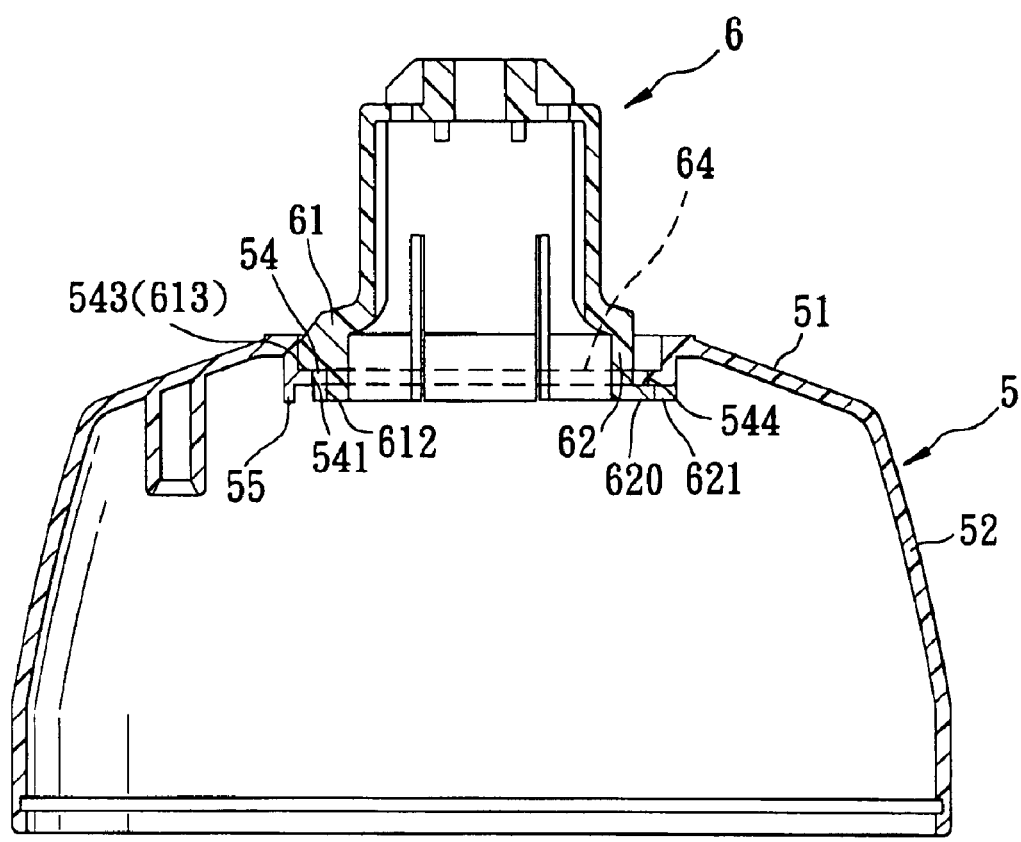
FIG. 4 is a sectional view to illustrate the rotary lamp base when assembled.

Accordingly, with further reference to FIG. 3, when the pivot seat 6 is extended through the through hole 511 in the top wall 51 of the shell member 5 from the bottom side 5101 of the top wall 51, the inner peripheral ring surface 541 of the anchoring ring 54 forces the wedge portions of the first anchor members 61 in radial inward directions until the wedge portions of the first anchor members 61 are disposed above the anchoring ring 54, during which time, with further reference to FIG. 4, the stop surfaces 613 of the wedge portions of the first anchor members 61 and the stop flanges 621 of the second anchor members 62 abut respectively against the top and bottom ring surfaces 543, 544 of the anchoring ring 54 such that the first and second anchor members 61, 62 engage rotatably the anchoring ring 54 to permit rotation of the shell member 5 relative to the pivot seat 6 about the hole axis 5110. By virtue of the engagement between the engaging tooth 621 on the pivot seat 6 and the inner peripheral ring surface 541 of the anchoring ring 54, the light sensor hole 522 in the peripheral wall 52 of the shell member 5 can be retained releasably at a desired angular orientation relative to the hole axis 5110. Therefore, in the lamp device of the present invention, detection of ambient light conditions by the light sensitive controller 42, which is mounted in the shell member 5, can be adjusted to meet actual requirements.

Figure 6:
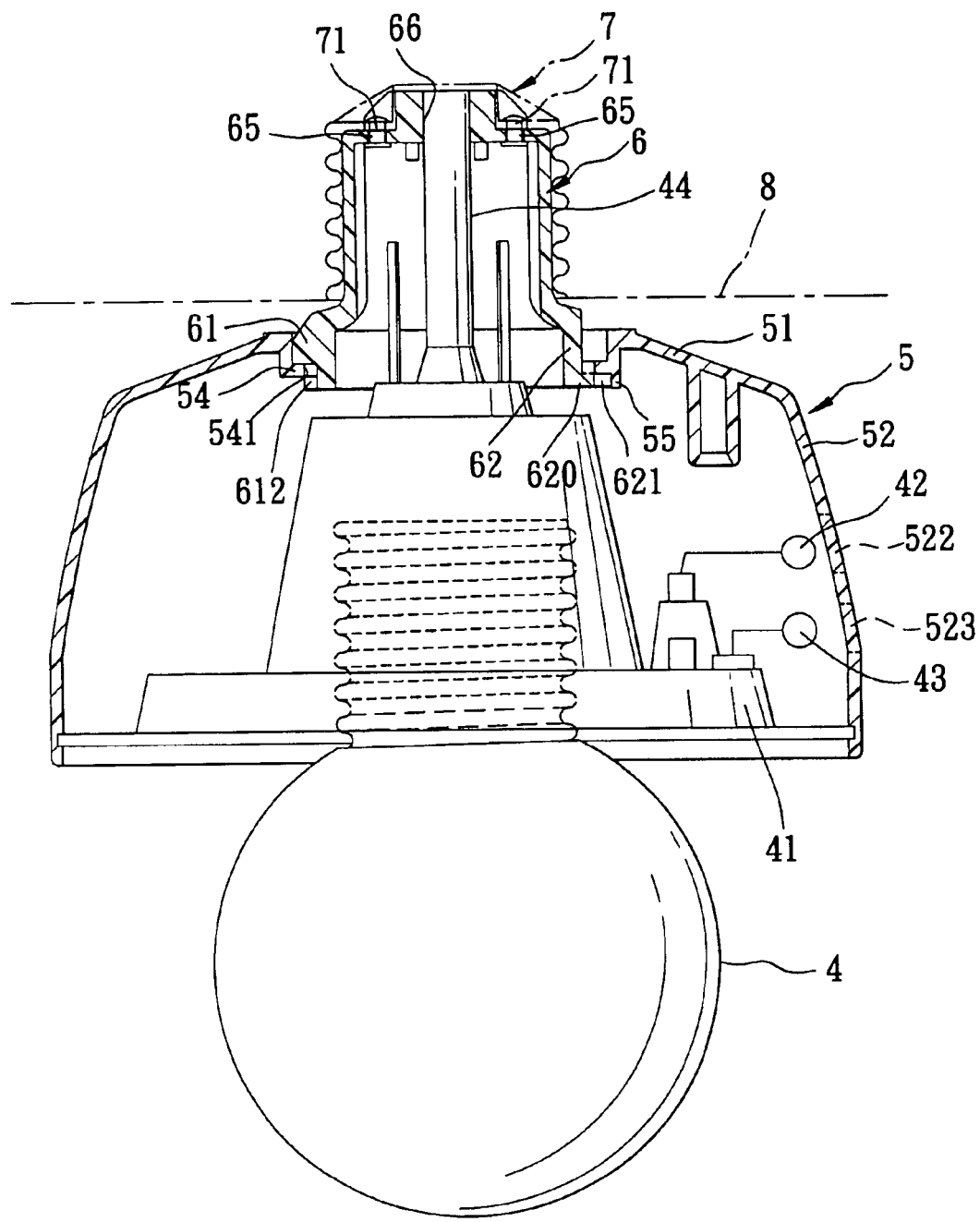
FIG. 6 is a view similar to FIG. 5, illustrating the preferred embodiment after adjustment of the rotary lamp base.

Referring further to FIGS. 5 and 6, the upper seat portion 68 of the pivot seat 6 is formed with a wiring hole 66 for extension of the power line 44 therethrough, and a pair of mounting holes 65. A support 7 is sleeved on the upper seat portion 68, and a pair of fasteners 71 (such as rivets) pass through the mounting holes 65 and secure the pivot seat 6 on the support 7, which was installed beforehand on a ceiling 8. The light bulb 4 can be mounted on the socket 41 through an open bottom end of the shell member 5. Moreover, a limiting unit is provided on the anchoring ring 54 and the lower seat portion 69 of the pivot seat 6 to limit extent of angular rotation of the shell member 5 relative to the pivot seat 6, thereby protecting the power line 44 from being twisted excessively. The limiting unit includes a first limit flange 55 formed on the outer peripheral ring portion 542 at the bottom ring surface 544 of the anchoring ring 54, and a second limit flange 621 formed on the stop flange 620 of one of the second anchor members 62.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A lamp device comprising:

a power line adapted to be connected to a power source;

a socket adapted for mounting a light bulb;

a light sensitive controller connected to said power line and said socket and adapted to enable and disable operation of the light bulb in accordance with ambient light conditions; and a rotary lamp base including a shell member including a top wall and a peripheral wall extending downwardly from a periphery of said top wall, said top and peripheral walls cooperating to confine a containing space, said socket and said light sensitive controller being mounted in said containing space, said top wall having top and bottom sides, and a through hole formed through said top and bottom sides to permit extension of said power line out of said containing space, said through hole having a hole axis, said peripheral wall being formed with a light sensor hole that is disposed in a radial direction relative to the hole axis and that is registered with said light sensitive controller to enable said light sensitive controller to detect ambient light conditions, a tubular pivot seat having upper and lower seat portions opposite to each other along the hole axis, and a retaining unit for retaining rotatably said lower seat portion of said pivot seat in said through hole in said top wall of said shell member so as to permit rotation of said shell member relative to said pivot seat about the hole axis.

2. The lamp device as claimed in claim 1, wherein said retaining unit includes:

an anchoring ring disposed in said through hole in said top wall of said shell member and having top and bottom ring surfaces, an outer peripheral ring portion connected to said top wall, and an inner peripheral ring surface opposite to said outer peripheral ring portion in radial directions relative to the hole axis, said outer peripheral ring portion and said inner peripheral ring surface being respectively disposed distal from and proximate to the hole axis; and resilient first and second anchor members formed on said lower seat portion of said pivot seat and alternately arranged in a circumferential direction relative to the hole axis;

each of said first anchor members having a wedge portion with a beveled surface that inclines radially, outwardly and downwardly relative to the hole axis, and a stop surface that extends from a lowermost edge of said beveled surface in a radial inward direction relative to the hole axis, each of said second anchor members having a distal lower end formed with a stop flange that extends radially and outwardly relative to the hole axis and that is vertically spaced apart from said stop surfaces of said wedge portions of said first anchor members so as to form a clearance corresponding to thickness of said anchoring ring;

said pivot seat being extendible through said through hole in said top wall of said shell member from said bottom side of said top wall when assembling said rotary lamp base such that said inner peripheral ring surface of said anchoring ring forces said wedge portions of said first anchor members in radial inward directions until said wedge portions of said first anchor members are disposed above said anchoring ring, during which time said stop surfaces of said wedge portions of said first anchor members and said stop flanges of said second anchor members abut respectively against said top and bottom ring surfaces of said anchoring ring such that said first and second anchor members engage rotatably said anchoring ring to permit rotation of said shell member relative to said pivot seat about the hole axis.

3. The lamp device as claimed in claim 2, wherein said inner peripheral ring surface of said anchoring ring is a serrated surface, said stop surface of said wedge portion of one of said first anchor members terminating at a distal end, said one of said first anchor members further having an anchor portion that extends downwardly from said distal end of said stop surface and that is formed with an engaging tooth, said engaging tooth engaging said inner peripheral ring surface of said anchoring ring to retain releasably said light sensor hole in said peripheral wall of said shell member at a desired angular orientation relative to the hole axis.

4. The lamp device as claimed in claim 2, further comprising a limiting unit provided on said anchoring ring and said lower seat portion of said pivot seat to limit extent of angular rotation of said shell member relative to said pivot seat.

5. The lamp device as claimed in claim 4, wherein said limiting unit includes a first limit flange formed on said outer peripheral ring portion at said bottom ring surface of said anchoring ring, and a second limit flange formed on said stop flange of one of said second anchor members.

6. The lamp device as claimed in claim 2, wherein adjacent ones of said first and second anchor members have a slit, which extends parallel to the hole axis, formed therebetween.

7. The lamp device as claimed in claim 1, wherein said upper seat portion of said pivot seat is formed with a wiring hole for extension of said power line therethrough, and a mounting hole adapted for passage of a fastener to permit securing of said pivot seat on a support.

8. A rotary lamp base comprising:

a shell member including a top wall and a peripheral wall extending downwardly from a periphery of said top wall, said top and peripheral walls cooperating to confine a containing space, said top wall having top and bottom sides, and a through hole formed through said top and bottom sides for access into said containing space, said through hole having a hole axis, said peripheral wall being formed with a light sensor hole that is disposed in a radial direction relative to the hole axis, said shell member further including an anchoring ring that is disposed in said through hole and that has top and bottom ring surfaces, an outer peripheral ring portion connected to said top wall, and an inner peripheral ring surface opposite to said outer peripheral ring portion in radial directions relative to the hole axis, said outer peripheral ring portion and said inner peripheral ring surface being respectively disposed distal from and proximate to the hole axis; and a tubular pivot seat extendible through said through hole in said top wall of said shell member and having upper and lower seat portions opposite to each other along the hole axis, said lower seat portion being formed with resilient first and second anchor members that are alternately arranged in a circumferential direction relative to the hole axis, each of said first anchor members having a wedge portion with a beveled surface that inclines radially, outwardly and downwardly relative to the hole axis, and a stop surface that extends from a lowermost edge of said beveled surface in a radial inward direction relative to the hole axis, each of said second anchor members having a distal lower end formed with a stop flange that extends radially and outwardly relative to the hole axis and that is vertically spaced apart from said stop surfaces of said wedge portions of said first anchor members so as to form a clearance corresponding to thickness of said anchoring ring;

said pivot seat being extendible through said through hole in said top wall of said shell member from said bottom side of said top wall such that said inner peripheral ring surface of said anchoring ring forces said wedge portions of said first anchor members in radial inward directions until said wedge portions of said first anchor members are disposed above said anchoring ring, during which time said stop surfaces of said wedge portions of said first anchor members and said stop flanges of said second anchor members abut respectively against said top and bottom ring surfaces of said anchoring ring such that said first and second anchor members engage rotatably said anchoring ring to permit rotation of said shell member relative to said pivot seat about the hole axis.

9. The rotary lamp base as claimed in claim 8, wherein said inner peripheral ring surface of said anchoring ring is a serrated surface, said stop surface of said wedge portion of one of said first anchor members terminating at a distal end, said one of said first anchor members further having an anchor portion that extends downwardly from said distal end of said stop surface and that is formed with an engaging tooth, said engaging tooth engaging said inner peripheral ring surface of said anchoring ring to retain releasably said light sensor hole in said peripheral wall of said shell member at a desired angular orientation relative to the hole axis.

10. The rotary lamp base as claimed in claim 8, further comprising a limiting unit provided on said anchoring ring and said lower seat portion of said pivot seat to limit extent of angular rotation of said shell member relative to said pivot seat.

11. The rotary lamp base as claimed in claim 10, wherein said limiting unit includes a first limit flange formed on said outer peripheral ring portion at said bottom ring surface of said anchoring ring, and a second limit flange formed on said stop flange of one of said second anchor members.

12. The rotary lamp base as claimed in claim 8, wherein adjacent ones of said first and second anchor members have a slit, which extends parallel to the hole axis, formed therebetween.

13. The rotary lamp base as claimed in claim 8, wherein said upper seat portion of said pivot seat is formed with a wiring hole adapted for extension of a power line therethrough, and a mounting hole adapted for passage of a fastener to permit securing of said pivot seat on a support.

* * * * *